G. W. CLOYD.
Hoe.
No. 222,015.　　　　Patented Nov. 25, 1879.
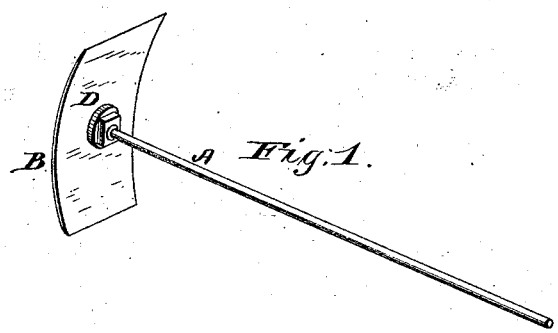
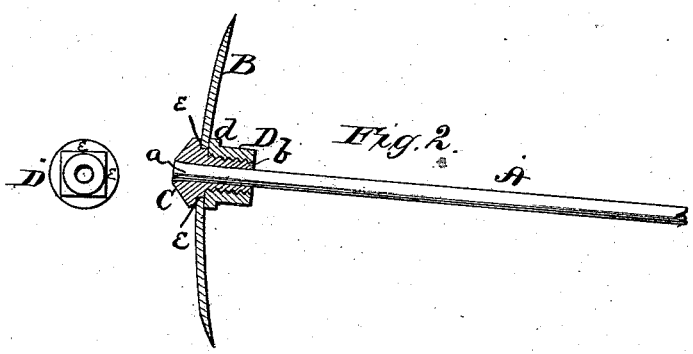
WITNESSES
Franck L. Ourand
J. J. McCarthy
INVENTOR
G. W. Cloyd
Alexander Mason
ATTORNEYS

UNITED STATES PATENT OFFICE.

GEORGE W. CLOYD, OF RACCOON BEND, KENTUCKY.

IMPROVEMENT IN HOES.

Specification forming part of Letters Patent No. 222,015, dated November 25, 1879; application filed April 23, 1879.

*To all whom it may concern:*

Be it known that I, GEORGE W. CLOYD, of Raccoon Bend, in the county of Laurel, and in the State of Kentucky, have invented certain new and useful Improvements in Hoes; and I do hereby declare that the following is a full, clear, and exact description thereof, reference being had to the accompanying drawings, and to the letters of reference marked thereon, making a part of this specification.

My invention relates to hoes; and it consists in the construction of devices for securing the hoe-blade to the handle, as will be hereinafter more fully set forth.

In order to enable others skilled in the art to which my invention appertains to make and use the same, I will now proceed to describe its construction and operation, referring to the annexed drawings, in which—

Figure 1 is a perspective view of a hoe embodying my invention. Fig. 2 is a section of the same.

A represents the hoe-handle, and B is the blade. The outer end of the handle A is formed with a gradually-increasing taper, as shown at $a$.

The device for fastening the blade to the handle is made in two parts, C and D. The part C is a head, with cylindrical projection $b$, which latter has exterior screw-threads, and a shoulder is also formed at the junction of the head and the screw-projection. The part D consists of an elongated nut with a round disk or flange, $d$, at one end.

Through the head C is made a central hole for the passage of the handle A. The screw-projection $b$ of the head C is passed through a slot in the hoe-blade until the blade rests on the shoulder $e$, when the nut D is screwed on said projection until the disk or flange $d$ will clamp the blade between it and the head C, as shown in Fig. 2.

The handle A is passed through the head C until the tapering end $a$ of the handle becomes wedged therein.

The hoe-blade can easily be removed for sharpening or other purposes.

Other garden-tools may be connected to the same handle by the same fastening device.

Having thus fully described my invention, what I claim as new, and desire to secure by Letters Patent, is—

In a garden implement, the head C, with screw-projection $b$ and shoulder $e$, and the elongated nut D, with disk or flange $d$, in combination with the blade B and the handle A, having tapering end $a$, substantially as and for the purposes herein set forth.

In testimony that I claim the foregoing I have hereunto set my hand this 15th day of April, 1879.

GEORGE W. CLOYD.

Witnesses:
M. C. GANES,
HENRY HARISON.